(12) United States Patent
Steinhilb et al.

(10) Patent No.: US 9,352,681 B2
(45) Date of Patent: May 31, 2016

(54) VEHICLE COMPONENT ATTACHMENT STRUCTURE FOR ENERGY ABSORPTION

(71) Applicant: Toyota Motor Engineering & Manufacturing North America, Inc., Erlanger, KY (US)

(72) Inventors: Aaron Richard Steinhilb, Westland, MI (US); Jeremiah Thomas Hammer, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/494,500

(22) Filed: Sep. 23, 2014

(65) Prior Publication Data
US 2016/0082878 A1    Mar. 24, 2016

(51) Int. Cl.
*B60Q 1/04* (2006.01)
(52) U.S. Cl.
CPC ............ *B60Q 1/0483* (2013.01); *B60Q 1/0408* (2013.01); *B60Q 1/0491* (2013.01)
(58) Field of Classification Search
CPC ...... B60Q 1/04; B60Q 1/0408; B60Q 1/0433; B60Q 1/0483; B60Q 1/0491; B60R 21/34; B62D 25/00; B62D 25/08; B62D 25/085; B62D 25/18
USPC ............. 296/187.03, 187.04, 187.09, 193.03; 362/459, 487, 507, 549
See application file for complete search history.

(56) References Cited

U.S. PATENT DOCUMENTS

| 6,471,386 B2 | 10/2002 | Oh |
| 7,517,121 B2 | 4/2009 | Arlon |
| 7,967,488 B2 | 6/2011 | Bae |
| 8,337,064 B2* | 12/2012 | Yonezawa ............ B60Q 1/0491 362/487 |
| 8,720,975 B1 | 5/2014 | Perez et al. |
| 8,814,394 B2* | 8/2014 | Aquilina .............. B60Q 1/0483 362/362 |

FOREIGN PATENT DOCUMENTS

FR    WO 2013054017 A1 *    4/2013    ........... B60Q 1/0441

* cited by examiner

*Primary Examiner* — Jason S Daniels
(74) *Attorney, Agent, or Firm* — Christopher G. Darrow; Darrow Mustafa PC

(57) ABSTRACT

An attachment bracket for attaching one vehicle component, such as a headlamp housing, to another vehicle component includes a wall with an upper end flange and a rib structure defining stiffness along one axis of the vehicle component and having a buckle portion allowing buckling and deformation of the attachment bracket along at least one perpendicular axis to absorb energy. The rib structure includes at least one rib extending along the wall of the attachment bracket, where the at least one rib includes a shape defining an intermediate buckle portion along the rib. The at least one rib may have a laterally extending notch, a lateral offset segment, a curved segment, or a thinner segment. One or more apertures formed in the wall to define the buckle portion. Any rib configuration may be provided on one or all of the opposed major wall surfaces of the attachment bracket.

20 Claims, 10 Drawing Sheets

VEHICLE COMPONENT ATTACHMENT STRUCTURE FOR ENERGY ABSORPTION

BACKGROUND

The present description relates, in general, to vehicle body structures and, particularly, to energy absorbing vehicle body structures.

Automobile and other vehicle bodies are typically formed of a number of metal and/or plastic components and body panels that are mounted on and connected to underlying rigid frame members. The components and body panels can be typically attached to the frame members by various attachment brackets which take a variety of different forms depending upon the location and shape of the associated components and body panels.

Such attachment brackets are designed to have a required amount of strength and stiffness so as to securely and non-movably affix the attached component or body panel to the underlying frame structure despite the vibrations and forces encountered during vehicle operation.

At the same time, such attachment brackets as well as the components and body panels themselves can be designed with energy absorption features so as to absorb impact energy exerted on the components and body panels and attachment brackets during a vehicle collision or impact with a stationary object or pedestrian. Such energy absorption is intended to minimize injury to the occupants of the vehicle as well as any pedestrians impacting with the vehicle.

Thus, there exists a need to create vehicle component and body panel attachment brackets which provide the requisite strength and stiffness for the attached component and vehicle body panels and at the same time are capable of deformation to absorb impact energy in the event the portion of the component or body panel attached by the attachment bracket to the underlying frame structure is impacted an external object, such as a pedestrian.

In particular, a vehicle headlamp housing is affixed to one or more surrounding vehicle components, including a vehicle fender, vehicle frame, radiator strap, etc. It is desirable that the headlamp housing has sufficient stiffness in all "x", "y", and "z" axes so as to be incapable of movement when the vehicle is at rest and during vehicle operation. To this end, as shown in FIGS. 1-3, an attachment bracket carried on the headlamp housing has a vertically extending wall which terminates in an angularly or perpendicularly disposed upper flange. An aperture in the upper flange receives a fastener for attaching the attachment bracket to an adjacent vehicle component, such as the vehicle fender inner flange.

As seen in FIGS. 2 and 3, the attachment bracket includes one or at least two vertically extending, laterally spaced ribs between the wall and the upper end flange. The ribs are generally oriented in the longitudinal vehicle direction so as to provide stiffness to the attachment bracket and thereby resist movement of the attachment bracket and the headlamp housing along one axis, such as in a horizontal or longitudinal direction, when the vehicle is stationary or during vehicle operation.

However, the stiffness and strength provided by the one or more ribs on the attachment bracket, while providing the requisite stiffness to horizontal movement of the attachment bracket and the attached headlamp housing, results in a substantially immovable structure which does not significantly yield when an impact force, such as a pedestrian striking the fender of the vehicle during a collision between the vehicle and the pedestrian, in the area of the attachment bracket thereby imposing a vertical load on the attachment bracket. The stiffness of the attachment bracket creates the substantially immovable structure which is difficult to deform due to high reaction forces, thereby creating a greater potential for pedestrian injury.

SUMMARY

An apparatus is disclosed for attaching one vehicle component to another vehicle component. The apparatus includes attaching a first vehicle component to a second vehicle component, including an attachment bracket including an upright wall and an upper end flange extending angularly from one end of the wall, at least one rib extending along the wall for supporting the attachment bracket along one stiffened axis, and at least one buckle portion carried on at least one of the wall and the at least one rib about which the at least one rib and the attachment bracket can deform along at least one axis perpendicular to the stiffened axis of the at least one rib.

The at least one rib may comprise a pair of spaced ribs extending along the wall of the attachment bracket.

The at least one rib may include a first leg extending from the upper end flange, a notch formed of at least two laterally and angularly extending legs defining an intermediate break point, and a second leg substantially is planar aligned with the first leg, with the laterally and angularly extending legs of the notch projecting laterally from the coplanar first and second legs.

The at least one rib may also include a first leg extending from the upper end flange, a laterally and angularly extending leg extending from the first leg, and a second leg extending from the laterally and angularly extending segment, the second leg laterally offset from the first leg.

The at least one rib may have an arcuate shape segment.

In one aspect, the at least one buckle portion is defined by at least one aperture formed in the wall of the attachment bracket.

The at least one buckle portion may also be defined as the least one rib including at least one thick portion and at least one thinner portion, the at least one thinner portion defining, in part, the buckling portion of the at least one rib.

In another aspect, a plurality of laterally spaced ribs each include a buckle portion. The buckle portions of each of the plurality of ribs are dimensionally offset along one axis.

In one aspect, the attachment bracket may be carried by a headlamp housing to attach the headlight housing to another vehicle component, such as a vehicle fender inner flange.

BRIEF DESCRIPTION OF THE DRAWING

The various features, advantages, and other uses of the present vehicle component attachment structure for energy absorption will become more apparent by referring to the following detailed description and drawing in which.

DETAILED DESCRIPTION

The following description discloses an attachment bracket for fixing a vehicle component, such as a vehicle body panel, or a headlamp housing to another vehicle component, such as a vehicle frame.

The following vehicle component attachment bracket with energy absorption features affixes a vehicle component, such as vehicle headlamp housing, in a fixed position to underlying or other vehicle components, such as a vehicle fender or other vehicle body frame structure. The attachment bracket provides strength and stiffness against movement along at least one axis of the vehicle and is capable of a deformation under impact force loads applied to the vehicle component or body panel affixed by the attachment bracket to other vehicle components to provide energy absorption features to minimize injury to a pedestrian in the event that the impact forces applied to the vehicle component and attachment bracket are due to an impact between the vehicle and a pedestrian. The following attachment bracket can be configured in various forms to absorb energy in any direction along any axis or multiple axes required for vehicle operation and at the same time provides stiffness and movement resistance features along other vehicle axes.

It will be understood that the following description of the attachment bracket as a headlamp housing attachment bracket which affixes headlamp housing to a vehicle fender is by way of example as the teachings and disclosure presented herein can be applied to attachment brackets on other vehicle components used in a vehicle.

In the following description, the various axes are described with reference to a vehicle. By way of nomenclature only, the "y" axis will be referred to as an axis aligned with or parallel to a longitudinal axis extending along a longitudinal centerline of the vehicle. The "x" axis extends laterally across the vehicle perpendicular to the "x." The "z" is a vertical axis perpendicular to the "x" and "y" axes.

Figure 1:
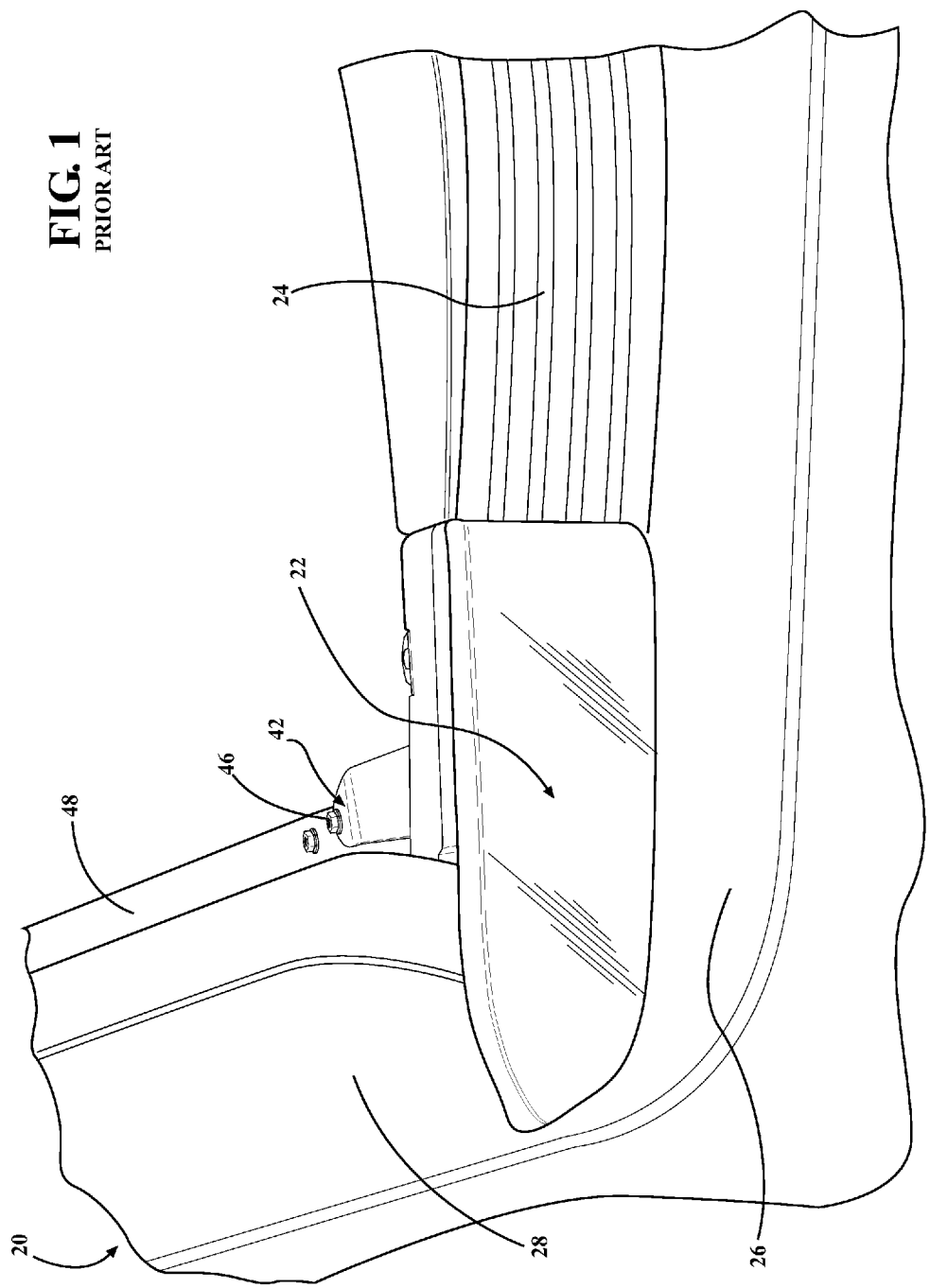
FIG. 1 is a partial, front perspective view of a vehicle showing a portion of a prior art headlamp housing to fender attachment bracket.
Figures 2, 3:
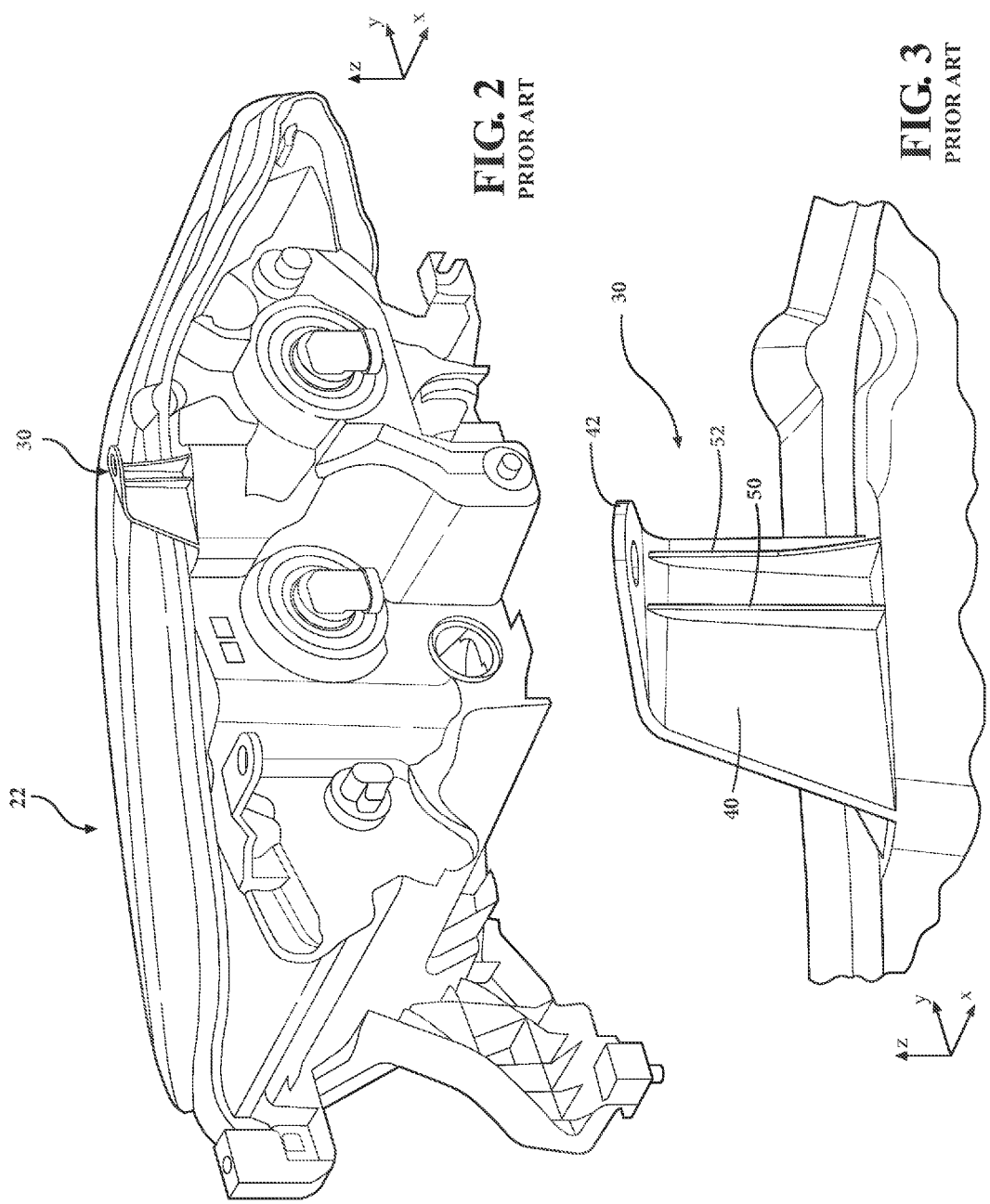
FIG. 2 is an enlarged rear perspective view of the prior art headlamp housing shown in FIG. 1.
FIG. 3 is a partial, enlarged perspective view of the prior art headlamp housing to fender attachment bracket shown in FIGS. 1 and 2.

Referring now to FIGS. 1-3, there is depicted a prior art vehicle structure in which a vehicle 20 includes a first vehicle component in the form of a headlamp housing 22 carrying one or more headlamps which is mounted in a stationary position at the forward end of the vehicle between a vehicle grille 24, a vehicle bumper 26 and a vehicle fender 28. Various attachment mounts or brackets are used to fix the headlamp housing 22 to the surrounding structure. By example, as shown in FIG. 2, the headlamp housing 22 includes attachment brackets 30, 32, 34, and 36.

The headlamp housing 22 is formed of a molded plastic such that the attachment brackets, including attachment bracket 30, are integrally and unitarily carried with the headlamp housing 22.

As shown in FIGS. 1-3, the headlamp housing attachment bracket 30, hereafter "attachment bracket 30", includes a wall 40 which projects substantially vertically or at an angle from a lower end unitarily joined to the remainder of the headlamp housing 22. A unitary upper end flange 42 projects angularly from an upper end of the wall 40 away from one major surface of the wall 40, such as a rearward facing surface of the wall 40 in the orientation shown in FIGS. 1-3. An aperture 44 is formed in the upper end flange 42 for receiving a fastener, such as a bolt 46 shown in FIG. 1, which joins the upper end flange 42 of the attachment bracket 30 to a second vehicle component, such as an inner flange 48 of a vehicle fender 28.

A pair of ribs 50 and 52 are unitarily formed on the wall 40 and the upper end flange 42 and are disposed below the upper end flange 42. The ribs 50 and 52 have a linear shape and are oriented substantially in line with the "x" axis parallel to the longitudinal centerline axis of the vehicle 20. The ribs 50 and 52 provide stiffness in the "x" axis direction to the wall 40 thereby providing a rigid structure affixing the headlamp housing 22 to the inner flange 48 of the fender 28 which resists movement in the horizontal "x" axis direction thereby maintaining the headlamp housing 22 in a fixed, stationary position.

The above described orientation of the ribs coplanar with the longitudinal center line "x" axis of the vehicle 20 will be understood to be by example. The attachment bracket 30 can be oriented such that the wall 40 can extend essentially along the "x" axis with respect to the vehicle 20, with the upper end flange 42 extending laterally from the "x" axis along the "y" axis. In this orientation, the ribs 50 and 52 will provide stiffness against movement of the wall 40 along the "y" axis.

It will also be understood that the attachment bracket 30 can be oriented with respect to the vehicle 20 such that the upper end flange 42 extends along the "x" axis, but toward the front of the vehicle, as compared to the rearward extending orientation of FIG. 1. In the same manner, a "x" axis orientation of the wall 40 can have the upper end flange 42 extending along the "y" axis from either major surface of the wall 40.

However, as described previously, the ribs 50 and 52, while providing the required horizontal axis stiffness to the attachment bracket 30, create a structure with high reaction forces to impact loads applied through the vehicle fender 28 to the attachment bracket 30 in a vertical direction from above the upper end flange 42.

Figure 4A:
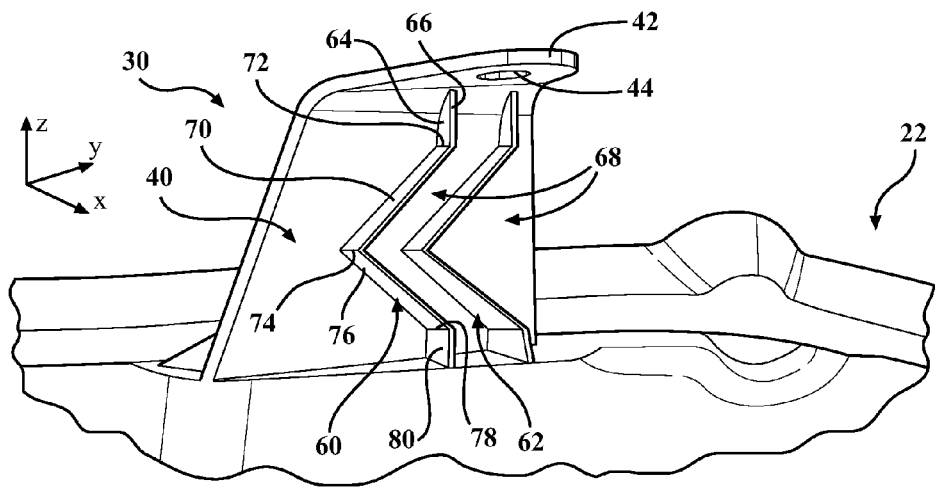
FIG. 4A is a perspective view of one aspect of a headlamp housing attachment bracket with energy absorption features.

As shown in FIG. 4A, the attachment bracket 30, which includes the same wall 40 and upper end flange 42, is provided with at least one or a plurality of at least two ribs, with two laterally spaced ribs 60 and 62 shown by example only, unitarily carried between the wall 40 and the underlying surface of the upper end flange 42. Each of the ribs 60 and 62 includes, starting at an upper end, a first leg 64 which projects generally perpendicularly from the underside of the upper end flange 42. The first leg 64 has a linear outer edge 66. A laterally and angularly extending segment, such as a notch 68, for example, is formed in each of the ribs 60 and 62 and is defined by a first angularly inward leg 70 extending from a first edge or break portion 72 to a second edge or second intermediate break portion 74, and a second leg 76 extending from the second edge or break portion 74 to a third break portion 78 which transitions to a bottom located second leg

80. The upper first leg 64 and the bottom second leg 80 are generally co-linear with each other. The notch 68 forms an opening along the outboard free edge of each of the ribs 60 and 62 which creates a deformable buckle portion when an impact load is applied to the attachment bracket 30.

Figure 4B:
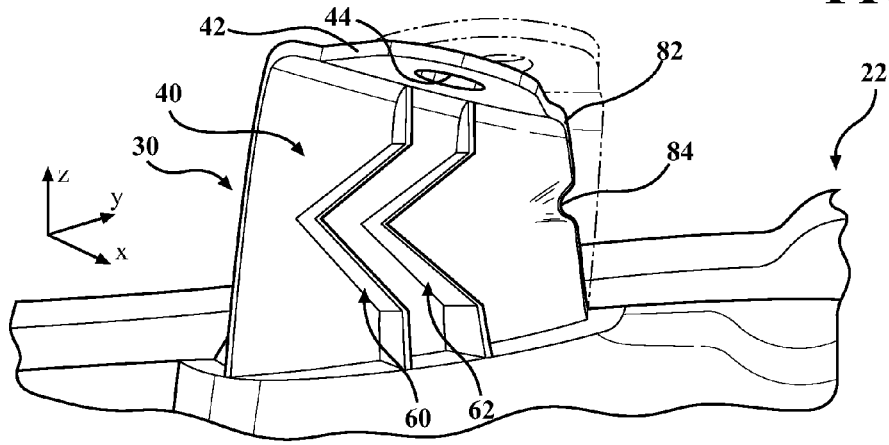
FIG. 4B is a perspective view, similar to FIG. 4A, but showing the attachment bracket depicted in FIG. 4A in a deformed state after an impact on the overlying body panel affixed to the attachment bracket.

The notch 68 causes an intermediate or central portion of the ribs 60 and 62 to project laterally or sideways from the upper first leg 64 and the lower second leg 80. This angular offset of the central portion of each rib 60 and 62 created by the laterally aligned notches 68 in each rib 60 and 62 allows the attachment bracket 30, including the wall 40, to deform in a predetermined controlled manner under vertical applied impact loads through the upper end flange 42. This deformation is shown in FIG. 4B wherein the notches 68 in the angular laterally offset central portions of each rib 60 and 62 allow the wall 40 of the attachment bracket 30 to deform along one edge 82 to create a buckle 84 in the wall 40 along the edge 82. This allows the upper end flange 42 to move in a downward and laterally outward direction. This deformation of the wall 40 and the controlled collapse of the attachment bracket 30 absorb energy during the impact event.

Figure 4C:
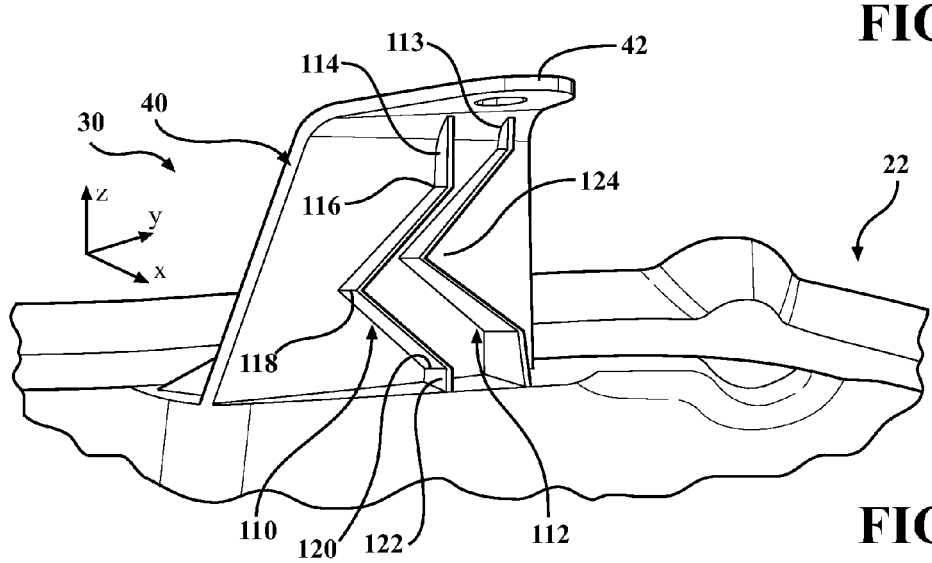
FIG. 4C is a perspective view of another aspect of the attachment bracket shown in FIG. 4A.

The attachment bracket 30 shown in FIG. 4C has at least one rib, with two ribs 110 and 112 being shown by example. Rib 112 is substantially the same as rib 62 shown in FIG. 4A. Rib 110 shares the same notch configuration as ribs 60, 62, and 112 except that an generally linear upper leg 114 has a longer length to extend further away from the undersurface of the upper end flange 42 than the corresponding upper leg 113 on the adjacent rib 112. Rib 110 still includes a first break portion or edge 116, an intermediate break edge 118, a lower break portion or edge 120 and a lower generally bottom leg 122. The bottom leg 122 is generally coplanarly aligned with the upper leg 114. This configuration vertically offsets the intermediate buckle portion in the rib 110 from the intermediate buckle portion in the rib 112.

This offset of the buckle points still results in a laterally directed deformation of the wall 40, in the manner shown in FIG. 4B, but with different buckle portions created by the vertically offset break portions or edges 118 and 124.

Figure 4D:
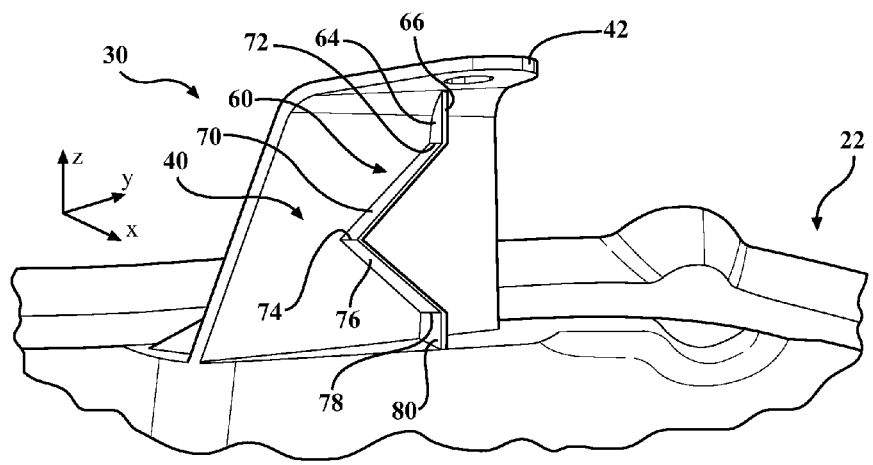
FIG. 4D is a perspective view of another aspect of the attachment bracket shown in FIG. 4A.

In FIG. 4D, the attachment bracket 30 is depicted with a single rib 60.

Figure 5A:
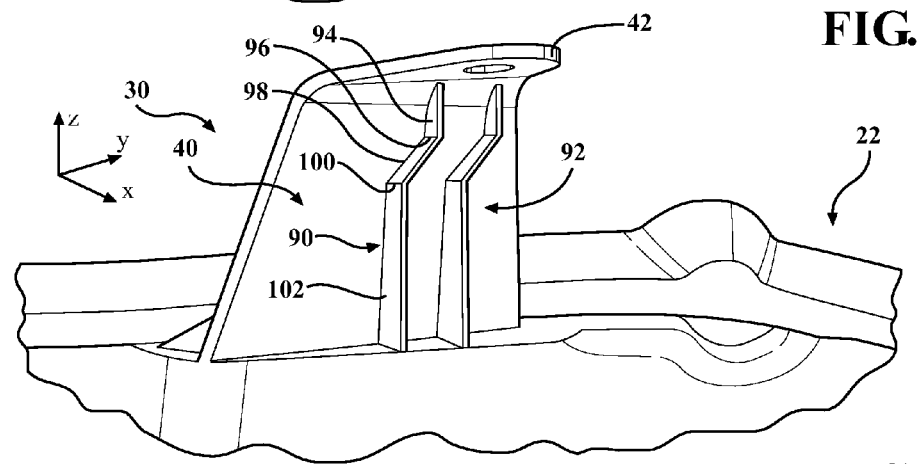
FIG. 5A is a perspective view of another aspect of the attachment bracket.
Figure 5B:
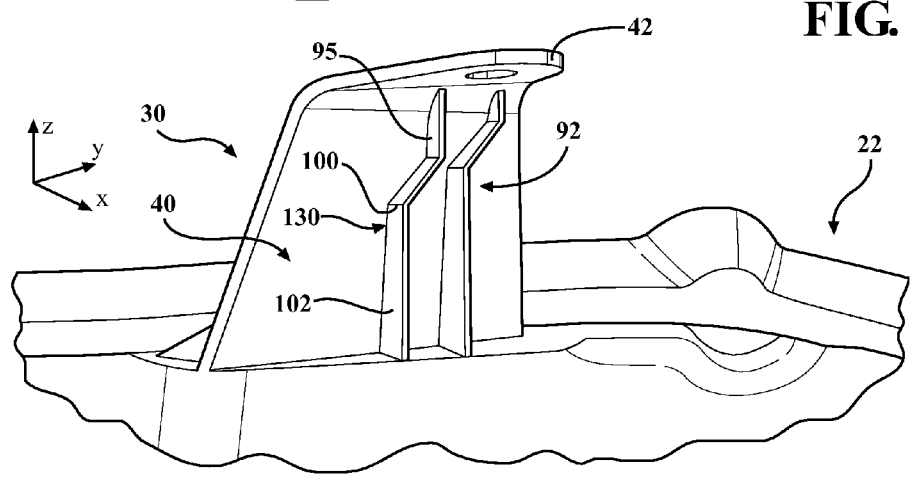
FIG. 5B is a perspective view of another aspect of the attachment bracket shown in FIG. 5A.
Figure 5C:
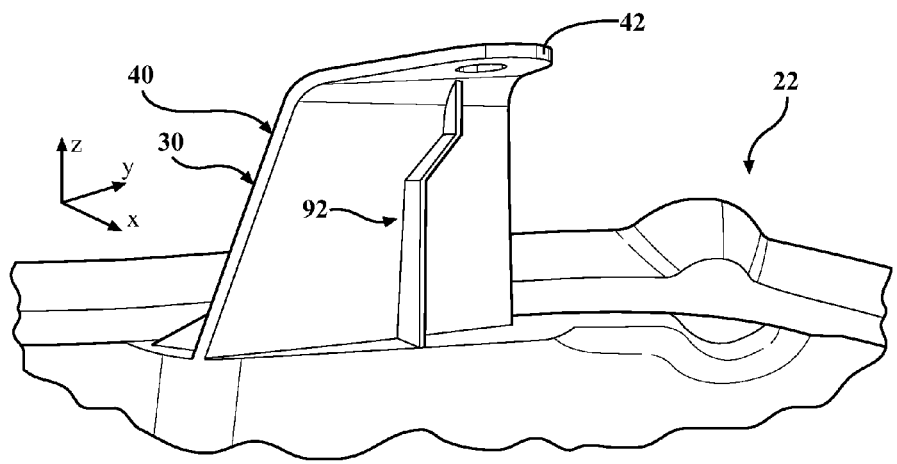
FIG. 5C is a perspective view of another aspect of the attachment bracket shown in FIG. 5A.

Referring now to FIGS. 5A-5C, there is depicted another rib structure for the attachment bracket 30. In this aspect, at least one rib, with two ribs 90 and 92 being shown by example, are unitarily formed on the attachment bracket 30 and extend between the upper end flange 42 and one surface of the housing 22. In this aspect, each rib 90 and 92, such as rib 90, has a generally linear upper first leg 94 extending from the inner side of the upper end flange 42. The upper first leg 94 transitions at edge 96 into an angularly extending intermediate leg 98 which ends at edge 100. A generally vertically linear bottom portion 102 extends from the edge 100. In this aspect, the bottom portion 102 of each rib 90 and 92 are vertically offset from the upper first legs 94 while still providing a buckle portion in the intermediate leg 98 at edge 100. The rib structure shown in FIG. 4C operates in substantially the same manner as the rib structure shown in FIG. 4A.

In FIG. 5B, the rib 92 is the same as the rib 62 shown in FIG. 5A. However, the adjacent rib 130, while having substantially a similar shape as the rib 90 shown in FIG. 5A, has a longer length linear upper first leg 95 which vertically offsets the intermediate break edge 100 of the rib 130.

FIG. 5C depicts the attachment bracket 30 with a single rib 92.

Figure 6A:
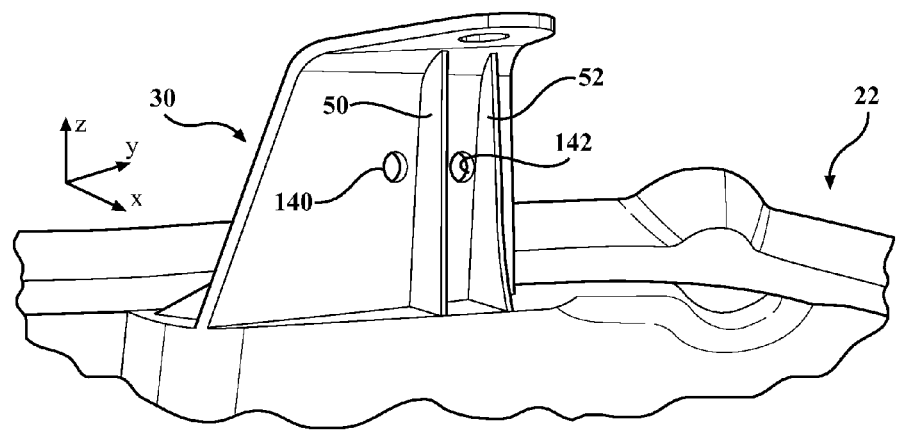
FIGS. 6A-6D are perspective views of other aspects of the attachment brackets.

Another aspect of an attachment bracket 30 is shown in FIGS. 6A-6D. In FIG. 6A, the rib structure shown in FIG. 3 in which the ribs 50 and 52 have a generally constant linear shape along their length is again employed. At least one discontinuity, illustrated in the form of a aperture, such as circular opening, as well as other shaped apertures, including oval, elliptical, polygonal or any irregular shape, is formed in the wall 40 at a defined location between the upper end flange 42 and the bottom portion of the wall 40. Two apertures 140 and 142 are depicted and associated with ribs 50 and 52 by example. The apertures 140 and 142 are co-linear in the wall 40. The apertures 140 and 142 provide a buckle portion in the wall 40 which allows the entire attachment bracket 30 to deform under vertical impact loads, despite the stiffness provided by the generally linear ribs 50 and 52 along the "x" axis.

The apertures 140 and 142 may be provided as a single aperture for each rib 50 or 52 and may be located on either side i.e., lateral left or lateral right of the associated rib 50 or 52. It will be understood that multiple vertically spaced apertures at constant or irregular spacing as well as multiple apertures on both sides of each rib may be provided in the wall 40.

Figure 6B:
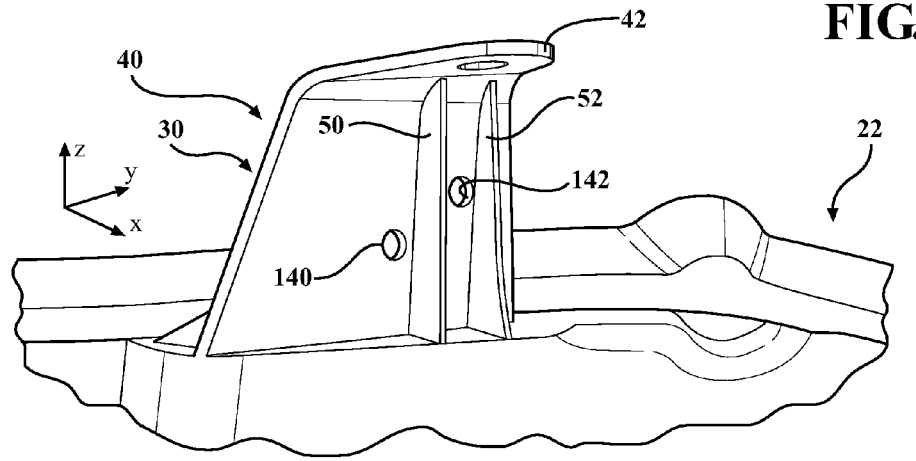

In FIG. 6B, the apertures 140 and 142 in the wall 40 are vertically offset in the same manner as the offset break points in the ribs 110 and 112 described above provide multiple buckle portions in the wall 40 during a controlled buckling collapse of the wall 40 on the vertical impact loads.

Figure 6C:
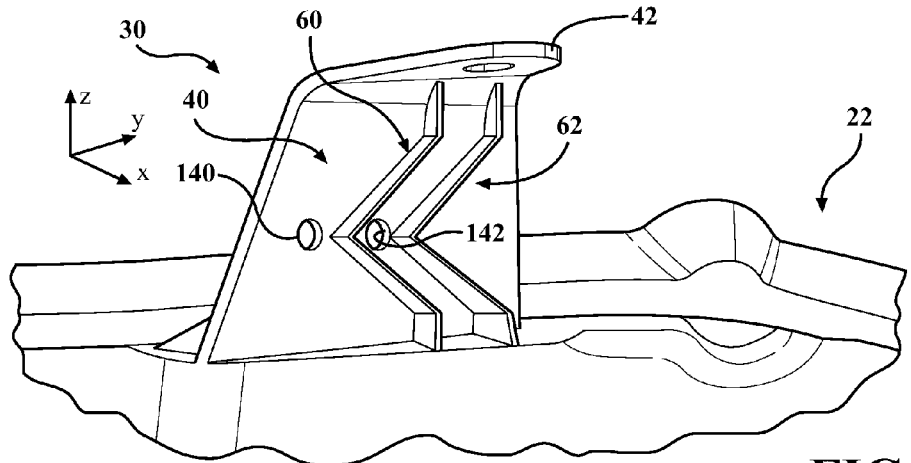
Figure 6D:
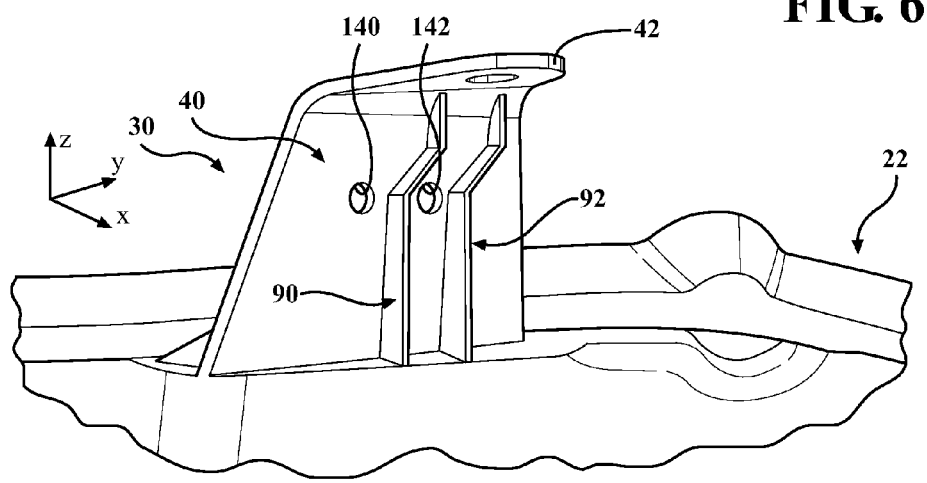

In FIG. 6C, the apertures 140 and 142 and the wall 40 are illustrated as being located adjacent to one side of the ribs 90 and 92 shown in FIG. 5A and described above.

Figure 7A:
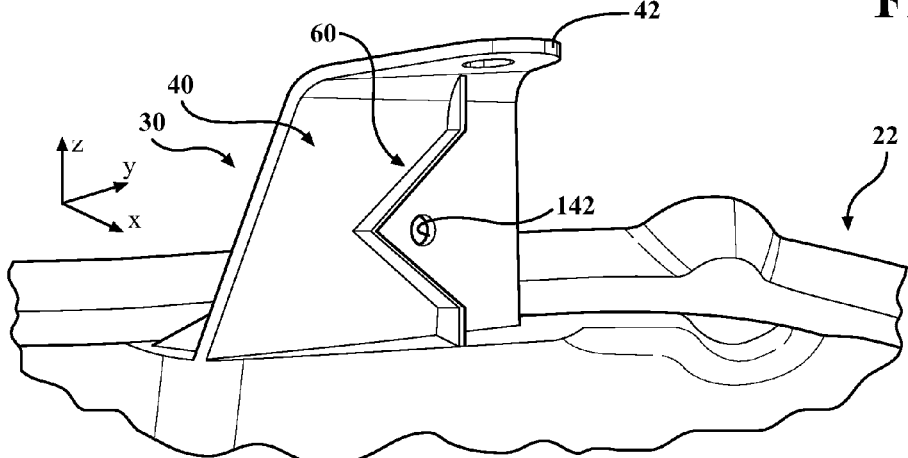
FIGS. 7A and 7B are perspective views of other aspects of the attachment brackets.
Figure 7B:
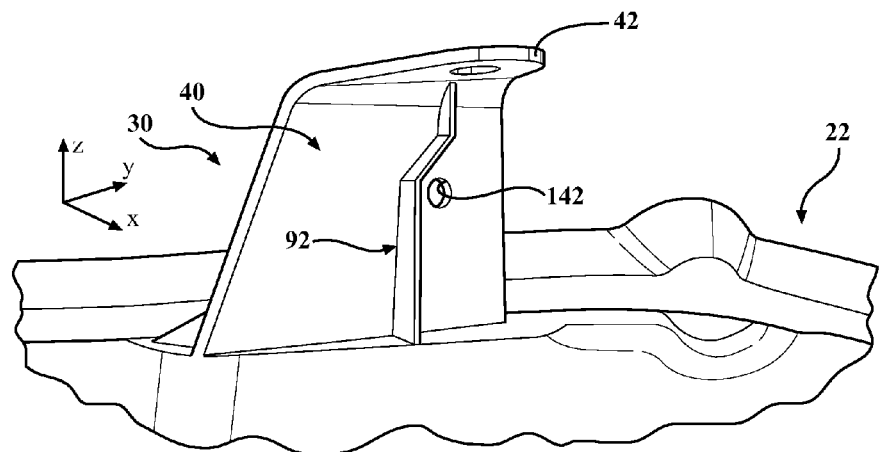

FIGS. 7A and 7B are similar to FIGS. 4D and 5C with respect to the associated structure of each single rib, but are illustrated as being used in conjunction with at least one aperture 140 in the wall 40.

Figure 8A:
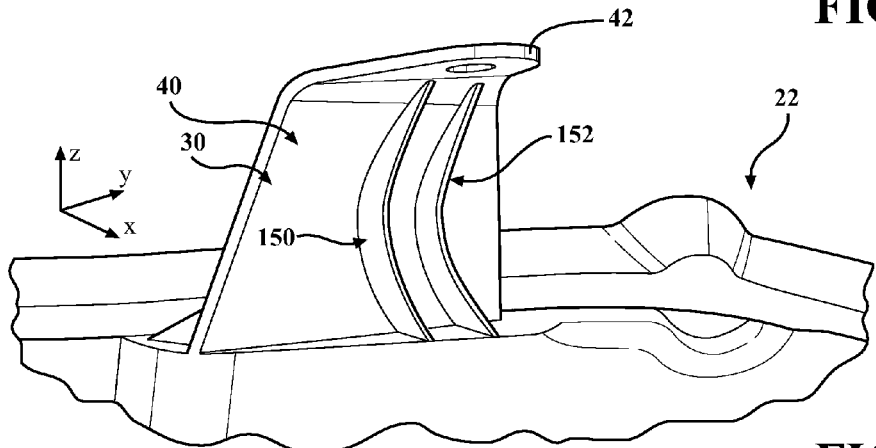
FIGS. 8A-8C are perspective view of other aspects of the attachment brackets.
Figure 8B:
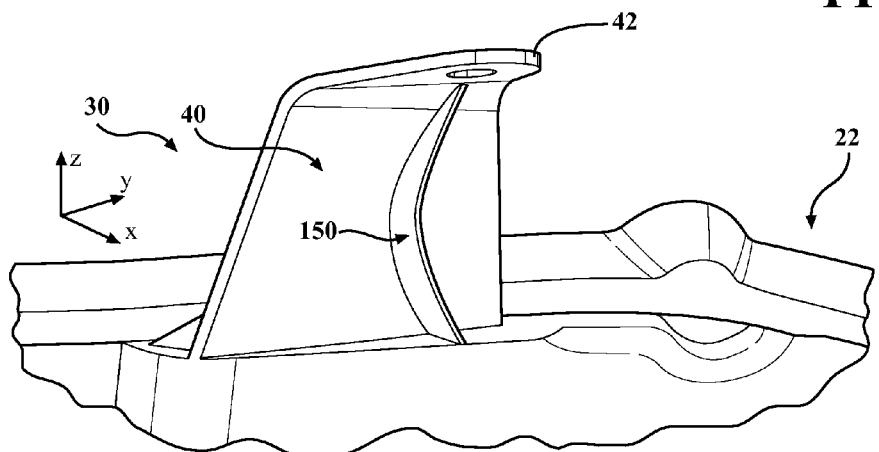
Figure 8C:
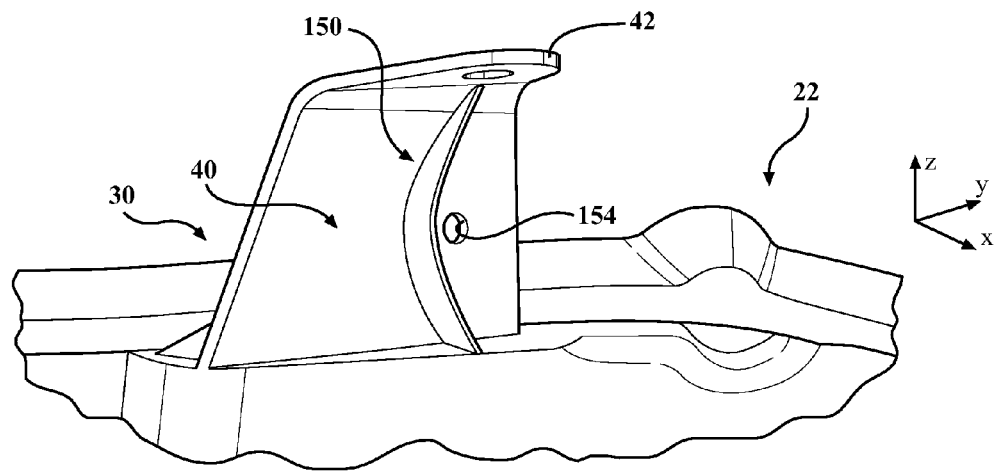

FIGS. 8A-8C depict yet another aspect of a rib structure for the headlamp housing attachment bracket 30. In FIG. 8A, at least one, with two ribs 150 and 152 shown by example, extend between the rear and underlying surfaces of the wall 40 and upper end flange 42. Each of the ribs 150 and 152 has an arcuate or curved shape between an upper end and a lower end. The arcuate shape may be at a constant radius or may have different radii sections. It will also be understood that the curvature of each of the ribs 150 and 152 may extend to the lateral left of each rib 150 and 152 in the orientation of the attachment bracket 30 shown in FIG. 8A or to the lateral right.

FIG. 8B depicts the curved rib structure applied to a single rib 150.

The curved rib structure described above may be applied to the laterally and angularly extending segments forming the notches 68, etc., in the above described ribs.

In FIG. 8C the single rib 150 is illustrated as being used in conjunction with at least one aperture 154 in the wall 40. It will be understood that the aperture 154 may be formed in the wall 40 on either or both sides of the rib 150.

Although not shown in FIG. 8C, one or more apertures, similar to aperture 134, may be used with the pair of ribs 150 and 152 shown in FIG. 8A.

Figure 9A:
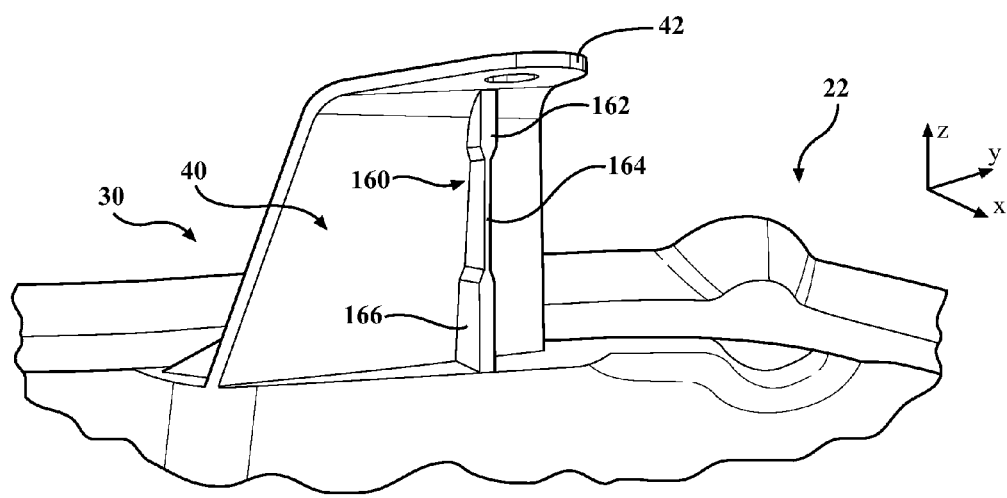
FIGS. 9A-9C are a rear elevational views of another aspect of the attachment bracket.
Figure 9B:
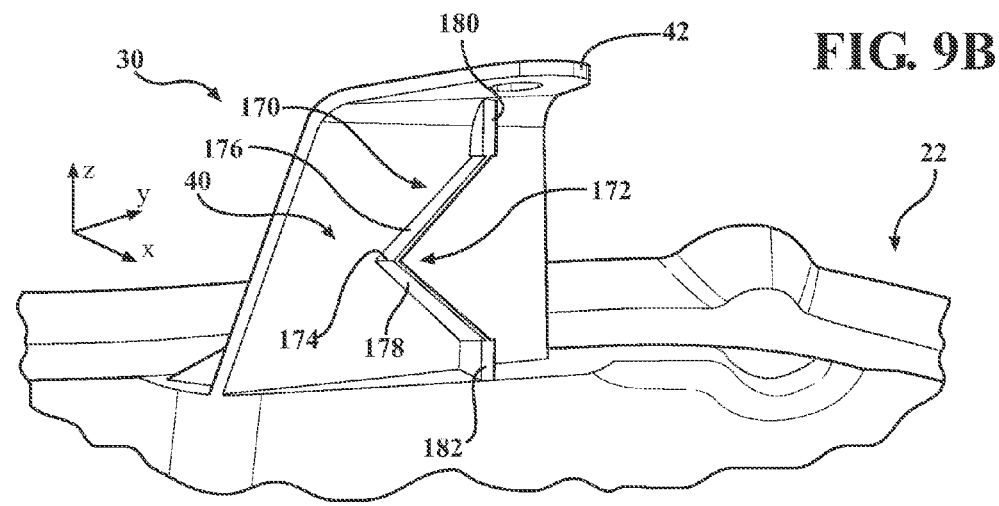
Figure 9C:
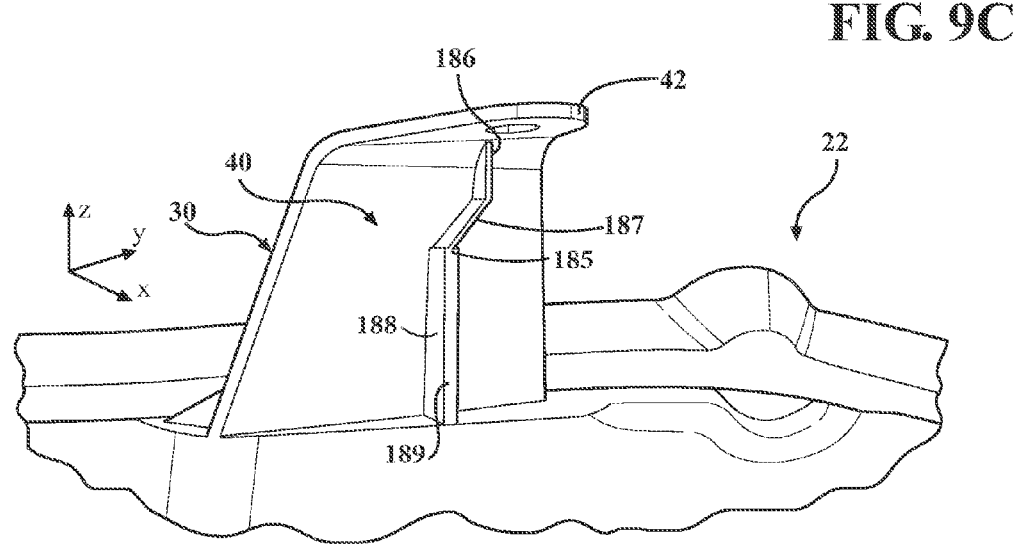

FIGS. 9A-9C depict another aspect of a rib structure for the headlamp housing attachment bracket 30. In this aspect, each rib can be provided with different thicknesses along the length of each rib. For example, the rib 160 shown in FIG. 9A has a linear shape similar to rib 50 shown in FIG. 2.

In this aspect, portions of each rib 160 may have different thicknesses to provide the controlled buckling or deformation of the attachment bracket 30 during a vertical impact force applied through the upper end flange 42 and/or the wall 40. By way of example, intermediate segment 164 has a smaller or reduced thickness than the larger thickness upper first leg 162 and lower second leg 166.

In FIG. 9B, rib 170 is similar to rib 60 shown in FIG. 4D in that it includes a single notch 172 formed at an intermediate edge 174 between first and second angled legs 176 and 178 extending between an upper first leg 180 and a lower second leg 182. In this aspect, the upper first leg 180 and the lower second leg 182 have a larger thickness in the "y" axis direction then the narrower thickness first and second angled legs 176 and 178. The thickness reduces the force required to buckle or deform the wall 40 and the rib 170 by a vertically imposed impact force at the location of the intermediate edge 174 of the notch 172.

In FIG. 9C, a rib 184 is similar to the rib 92 as shown in FIG. 5C in that it includes an upper first leg 186 an angled leg 187 and a lower leg 188. In this aspect, the angled leg 187 and possibly a portion of the second leg 188 may have a reduced thickness as compared to a larger thickness of the upper first leg 186 and optionally a lower end portion 189 of the second leg 188.

It will be understood that the increased thickness of the lower end portion 189 of the second lower leg 188 may extend for the entire or at least substantially the entire length of the second leg 188 up to the intermediate edge 185 forming the buckle portion of the rib 184.

It should be noted that despite the thinner portions of the rib 170, the rib 170 still provides the requisite stiffness or strength in a horizontal, longitudinal direction along the "x" axis of the vehicle, but is capable of deformation in a vertical direction along the "z" axis and the lateral direction along the "y" axis in the same manner as the rib structure shown in FIG. 4b.

It will be understood that the rib structure for the headlamp housing attachment bracket 30 described above in various aspects can be provided with combinations of the different rib structures. That is, for example, each of the ribs 50, 52, 60, 62, 90, 92, 110, 112, and 150 may include one or more apertures. Further, the apertures may be applied to one rib of a multiple rib structure, such as the pair of ribs 60 and 62 or in different sides of the multiple ribs 60 and 62, as well as having additional vertically spaced apertures associated with only one of the multiple ribs 60 and 62.

Further, it will be understood that the thinner rib structure shown in FIGS. 9A, 9B and 9C can be applied to each of the ribs 60, 62, 90, 92, 110, 112, and 150. The thinner portions of each rib would be along the portion of each rib where a break or buckle portion is desired, such as along the break portion 74 of rib 60, etc. For the curved rib 150, the thinner section can be applied at the center of the curved arc or along the substantial portion of the arc.

Further, multiple ribs may be provided on a single attachment bracket 30 which incorporate one or more of the different rib structures described above. Thus, a multiple rib structure may be provided for the attachment bracket 30 which uses rib 60 and rib 90 or rib 132, each with or without adjacent apertures in the wall 40. Each such rib of a multiple rib structure employing different rib configurations may also have thinner portions vertically offset from each other in the multiple ribs as well as having different thicknesses along each rib.

Figure 10:
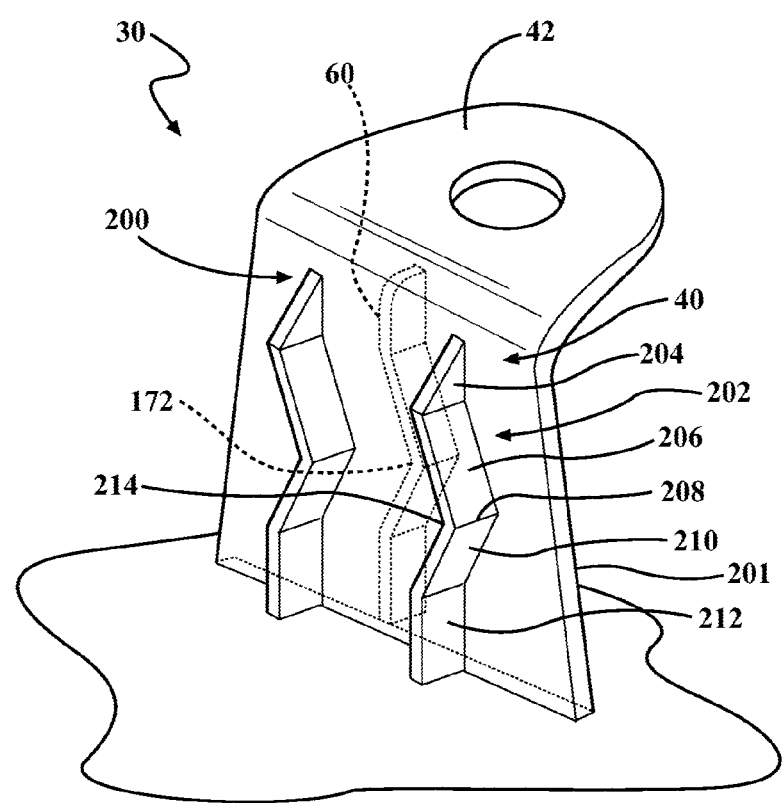
FIG. 10 is a perspective view of another aspect of the attachment bracket.

Referring now to FIG. 10, there is depicted another aspect of the attachment bracket 30 in which one or more ribs can be mounted to extend along at least a portion of the vertically extending wall 40 on an opposite surface of the wall 40 than that shown for the ribs 60, etc.

The notch portions of ribs on the rear wall surface 201 may be coplanar or vertically offset from the notch portions of the ribs on the opposed front wall surface 203.

As shown in FIG. 10, the attachment bracket 30 includes a single rib 60 mounted along at least a portion of the surface 201 of the wall 40. It will be understood that the use of the terms "rearward" or "rear" as well as "forward" or "front" applies to the orientation of the attachment bracket 30 shown in FIGS. 1-3 with respect to the vehicle 20. Other orientations of the attachment bracket 30, such as an orientation where the vertically extending wall 40 extends along the "x" axis of the vehicle instead of the "y" axis will be described as having front and rear wall surfaces, but such front and rear wall surfaces do not necessarily align or extend in the forward or rearward longitudinal or lateral directions of the vehicle 20.

As shown in FIG. 10, at least one rib 200, with two ribs 200 and 202 shown by example, are mounted on and extend along at least a portion of the forward facing major wall surface 203 of the wall 40. The rib or ribs 200, 202 can take any of the forms of the ribs 60, etc., described above. In this aspect, by example, the ribs 200 and 202 are equally spaced with respect to the single rib 60 on the opposed rear wall surface 201 of the wall 40. In the case of multiple ribs 60, 62 on the rear wall 201, the ribs 200, 202 can be interspersed or in an alternating offset arrangement with the rear mounted ribs 60 and 62.

Although the ribs 200 and 202 on the front wall 203 can have any shape, such as any of the rib shapes described above and shown in FIGS. 1-9C for example, the ribs 200 and 202 are illustrated in FIG. 10 as having a first upper leg 204, a notch formed by laterally angularly extending legs 206 and 210 which meet at an intermediate break or buckle portion 208 and a lower bottom leg 212 which is coplanar aligned with the upper first leg 204. The notches 214 formed by the laterally and angularly extending legs 206 and 210 can project in the same direction as the notch 172 on the rib 60. It will be understood that the notches 214 in the ribs 200 and 202 may extend in opposite directions from the direction of the notch 172 in the rib 60 to provide a buckling movement of the attachment bracket 30 under impact load which may also rotate the attachment bracket 30 about a vertical axis.

The upper first leg 204 of the ribs 200 and 202 is shown as having a tapered edge which transitions smoothly with the wall surface 203 or the edge between the wall surface 203 and the upper end flange 42.

Any of the ribs and/or buckle portions described above for the rear wall surface of the wall 40 can be mirrored or applied in various combinations to the front wall surface 203. Various combinations of rib structures, either formed of multiple identically shaped ribs, or a combination formed of multiple different shaped ribs and/or apertures 140, etc., in the wall 40, can be combined to provide buckling of the attachment bracket 30 along any axis and in a variety of deformation directions.

In conclusion, the above described vehicle component attachment structure or bracket provided with various design rib structures which provide stiffness and resistance to movement of the attachment bracket and the attached vehicle component(s) in at least one axis; but provide a deformable or buckle portion along at least one other axis to allow buckling or deformation of the attachment bracket upon an impact force applied to the attachment bracket. This deformation or buckling provides energy absorption to minimize injury in the event that the vertical impact is a result of a pedestrian impacting with a vehicle in the area of the attachment bracket.

What is claimed is:

1. An apparatus for attaching a first vehicle component to a second vehicle component, the apparatus comprising:
    an attachment bracket including an upright wall having an interior portion and opposing side edges, the upright wall extending along and defining a stiffened axis, and an upper end flange extending angularly from an upper end of the wall;

at least one rib spaced a distance inward from the opposing side edges and extending along the interior portion of the wall for supporting the attachment bracket along the stiffened axis; and at least one buckle portion defined by at least one of the wall and the at least one rib about which the at least one rib and the attachment bracket deforms in a direction perpendicular to the stiffened axis, allowing the upright wall to deform at one of the opposing side edges, and thereby allowing the upper end flange to deform in both a downward direction and a laterally outward direction.

2. The apparatus of claim 1 comprising:
a pair of spaced ribs extending along the wall of the attachment bracket.

3. The apparatus of claim 1 wherein the at least one rib comprises:
a first leg extending from an underside of the upper end flange;
a notch defined by at least two laterally and angularly extending segments defining an intermediate break point; and
a second leg substantially coplanar with the first leg, with the laterally and angularly extending segments of the notch projecting laterally from the coplanar first and second legs.

4. The apparatus of claim 1 wherein the at least one rib comprises:
a first leg extending from an underside of the upper end flange;
a laterally and angularly extending segment extending from the first leg; and
a second leg extending from the laterally and angularly extending segment, the second leg laterally offset from the first leg.

5. The apparatus of claim 1 wherein the at least one rib comprises:
an arcuate shaped segment.

6. The apparatus of claim 1 wherein the wall of the attachment bracket defining the at least one buckle portion on the attachment bracket further defines at least one aperture.

7. The apparatus of claim 1 wherein the at least one rib includes at least one thick portion and at least one thinner portion, the at least one thinner portion defining, in part, the buckle portion of the at least one rib.

8. The apparatus of claim 1 wherein:
the first vehicle component is a vehicle headlamp housing; and
the second vehicle component is a vehicle fender.

9. The apparatus of claim 1 comprising:
a pair of laterally spaced ribs including respective buckle portions,
wherein the buckle portions of the pair of laterally spaced ribs are dimensionally offset from each other along the stiffened axis.

10. The apparatus of claim 1 comprising:
a plurality of ribs, at least one of the plurality of ribs mounted on each of opposed major wall surfaces of the attachment bracket.

11. A vehicle headlamp housing comprising:
an attachment bracket coupled to a vehicle headlamp housing and including:
an upright wall having an interior portion and opposing side edges, the upright wall extending along and defining a stiffened axis;
an upper end flange extending angularly from an end of the wall, the upper end flange configured for attachment to another vehicle component;
at least one rib spaced a distance inward from the opposing side edges and extending along the interior portion of the wall for supporting the attachment bracket along the stiffened axis; and
at least one buckle portion defined by at least one of the wall and the at least one rib about which the at least one rib and the attachment bracket deforms in a direction perpendicular to the stiffened axis, allowing the upright wall to deform at one of the opposing side edges, and thereby allowing the upper end flange to deform in both a downward direction and a laterally outward direction.

12. The vehicle headlamp housing of 11 comprising:
at least two spaced ribs, each extending along the wall of the attachment bracket.

13. The vehicle headlamp housing of claim 11 wherein the at least one rib comprises:
a first leg extending from an underside of the upper end flange;
a notch formed of at least two laterally and angularly extending segments defining an intermediate break point; and
a second leg substantially coplanar aligned with the first leg, with the laterally and angularly extending segments of the notch projecting laterally from the coplanar first and second legs.

14. The vehicle headlamp housing of claim 11 wherein the at least one rib comprises:
a first leg extending from an underside of the upper end flange;
a laterally and angularly extending segment extending from the first leg; and
a second leg extending from the laterally and angularly extending segment, the second leg laterally offset from the first leg.

15. The vehicle headlamp housing of claim 11 wherein the at least one rib comprises:
an arcuate shaped segment.

16. The vehicle headlamp housing of claim 11 wherein the wall of the attachment bracket defining the at least one buckle portion on the attachment bracket further defines at least one aperture.

17. The vehicle headlamp housing of claim 11 wherein the at least one rib includes at least one thick portion and at least one thinner portion, the at least one thinner portion defining, in part, the buckle portion of the at least one rib.

18. The vehicle headlamp housing of claim 11 wherein:
the another vehicle component is a vehicle fender.

19. The vehicle headlamp housing of claim 11 comprising:
at least two laterally spaced ribs including respective buckle portions,
wherein the buckle portions of the at least two laterally spaced ribs are dimensionally offset from each other along the stiffened axis.

20. The vehicle headlight housing of claim 11 comprising:
a plurality of ribs, at least one of the plurality of ribs mounted on each of opposed major wall surfaces of the attachment bracket.

* * * * *